US008695896B2

(12) United States Patent
Tu

(10) Patent No.: US 8,695,896 B2
(45) Date of Patent: Apr. 15, 2014

(54) PERFUME ATOMIZER

(75) Inventor: Xufeng Tu, Yuyao (CN)

(73) Assignee: Zhejiang JM Industry Co., Ltd., Yuyao (CN)

( * ) Notice: Subject to any disclaimer, the term of this patent is extended or adjusted under 35 U.S.C. 154(b) by 315 days.

(21) Appl. No.: 13/338,352

(22) Filed: Dec. 28, 2011

(65) Prior Publication Data

US 2013/0126639 A1 May 23, 2013

Related U.S. Application Data

(60) Provisional application No. 61/563,302, filed on Nov. 23, 2011.

(51) Int. Cl.

| | |
|---|---|
| ***B05B 9/043*** | (2006.01) |
| ***B05B 11/02*** | (2006.01) |
| ***B05B 11/00*** | (2006.01) |
| ***B65B 3/18*** | (2006.01) |
| ***G01F 11/00*** | (2006.01) |

(52) U.S. Cl.

USPC ..................... 239/333; 222/321.7; 222/321.9; 222/383.1; 222/385; 141/113; 141/349; 141/351

(58) Field of Classification Search

USPC .......... 239/302, 329, 331, 333, 337; 222/320, 222/321.1, 321.2, 321.5–321.9, 383.1, 384, 222/385, 481, 481.5, 482; 141/2, 3, 18, 20, 141/113, 348, 349, 351, 356

See application file for complete search history.

(56) References Cited

U.S. PATENT DOCUMENTS

| | | | | |
|---|---|---|---|---|
| 3,181,737 | A * | 5/1965 | Chaucer | 222/136 |
| 3,559,701 | A | 2/1971 | Witterscheim | |
| 3,718,165 | A | 2/1973 | Grothoff | |
| 4,473,097 | A | 9/1984 | Knickerbocker et al. | |
| 4,750,532 | A | 6/1988 | Grothoff | |
| 5,524,680 | A | 6/1996 | de Laforcade | |
| 5,623,974 | A * | 4/1997 | Losenno et al. | 141/20 |
| 5,791,527 | A | 8/1998 | Giuffredi | |
| 6,533,482 | B1 | 3/2003 | Byun | |
| 6,857,806 | B2 | 2/2005 | Harrison et al. | |
| 7,377,296 | B2 | 5/2008 | Gueret | |
| 7,665,635 | B2 * | 2/2010 | Ramet et al. | 222/321.7 |
| 7,743,949 | B2 * | 6/2010 | Ramet | 222/321.9 |

(Continued)

FOREIGN PATENT DOCUMENTS

| | | |
|---|---|---|
| CN | 2114634 | 9/1992 |
| CN | 201055827 | 5/2008 |

(Continued)

OTHER PUBLICATIONS

Travolo, Travolo Perfume Atomizer Extended Information, http://us.travolo.com/4ml-perfume-atomizer.html , last accessed Nov. 21, 2011.

*Primary Examiner* — Darren W Gorman

(74) *Attorney, Agent, or Firm* — Haugen Law Firm PLLP

(57) ABSTRACT

A re-fillable liquid spray dispenser useful as a fragrance atomizer includes a re-filling valve apparatus that is cooperative with a discharge nozzle of a liquid reservoir. A main chamber into which liquid may be filled in the spray dispenser is cyclically vented in unison with liquid injection through the re-filling valve apparatus. In this way, the liquid spray dispenser is accurately and efficiently vented during a liquid filling operation.

12 Claims, 7 Drawing Sheets

(56) References Cited

U.S. PATENT DOCUMENTS

| | | | |
|---|---|---|---|
| 8,079,388 | B2 | 12/2011 | Turgeman |
| 2005/0056343 | A1 | 3/2005 | Gueret |
| 2012/0090733 | A1 | 4/2012 | Turgeman |

FOREIGN PATENT DOCUMENTS

| | | |
|---|---|---|
| EP | 1283180 | 12/2003 |
| FR | 2698341 | 5/1994 |
| FR | 2802447 | 6/2001 |
| FR | 2893598 | 5/2007 |
| GB | 2095103 | 9/1982 |
| GB | 2229380 | 9/1990 |
| JP | 8175578 | 7/1996 |
| JP | 2004182305 | 7/2004 |
| WO | 0243794 | 6/2002 |

* cited by examiner

PERFUME ATOMIZER

CROSS-REFERENCE TO RELATED APPLICATIONS

This application claims priority to U.S. provisional patent application Ser. No. 61/563,302 filed on Nov. 23, 2011 and entitled "Perfume Atomizer," the content of which being incorporated herein in its entirety.

FIELD OF THE INVENTION

The present invention relates to liquid dispensers generally, and more particularly to a re-fillable liquid spray dispenser having a mechanism for re-filling the dispenser without risk of liquid spillage, as well as an efficient mechanism for venting air as the dispenser is re-filled with liquid.

BACKGROUND OF THE INVENTION

Manual liquid dispensers of various sorts have been widely implemented in a variety of applications. One type of liquid dispenser is a manually operated pump that is arranged to dispense a liquid in a fine mist. Such liquid dispensers are commonly referred to as "atomizers", in that the liquid is dispensed in very small liquid droplets. A common application for such liquid spray dispensers is in the dispensing of fragrance.

Liquid spray dispensers typically utilize a reciprocating pump that is manually operated by an external force applied against a restorative spring force of an expansion spring, with the application and removal of the external force being sufficient to generate pressure changes in the liquid chamber of the dispenser to alternately cause liquid dispensation and intake of liquid for the next pumping cycle. Liquid forced under pressure through a spray nozzle generates a dispersed mist of very small liquid droplets. Typically, liquid spray dispensers of this type comprise a pump mechanism which contains a liquid chamber, and a piston that is manually reciprocated in the pump mechanism. The piston is mounted for reciprocating movement in the liquid chamber, such that movement of the pump against a spring force causes the piston to move in the liquid chamber to thereby exert a compression force on the liquid in the chamber. Such force causes the liquid to move through a liquid passage to the spray outlet. Release of the external downward force to the pump permits the spring to expand under its restorative force, and to thereby return the pumping mechanism to its extended position. This movement of the pump mechanism causes the piston to move in the liquid chamber in a manner which expands the interior volume of the chamber. The negative pressure created by such movement draws liquid into the liquid chamber. Valve assemblies are typically employed in controlling the flow of liquid into the liquid chamber as its interior volume is increased by the movement of the pump mechanism.

In some cases, it has been found beneficial to be able to re-fill the liquid chamber in liquid spray dispensers. The ability to re-fill the liquid chamber permits re-use of the dispenser. Not only does re-use of the dispenser promote conservation of the materials employed in manufacturing the dispenser, but also permits the manufacture of more expensive dispensers, both in form and function. One particular example is a reusable fragrance atomizer having an overall size that is suitable for storage in a pocket or small purse. While such small dimensions are useful for portability, the fragrance capacity is compromised. Thus, it may be beneficial to be able to re-fill the liquid chamber in such portable dispenser.

A number of approaches have been implemented for re-filling a liquid chamber in a liquid spray dispenser. One approach is to merely open the liquid chamber and pour in the replacement liquid with the use of a funnel. This technique, however, is time-consuming and can result in spillage of the refilling liquid. Another approach is a liquid inlet valve incorporated with the liquid spray dispenser for injecting replacement liquid into the liquid chamber. The liquid inlet valve is configured for engagement with a dispensing nozzle of a large liquid reservoir. While various designs for inlet valve systems to liquid spray dispensers have been implemented, conventional designs do not establish quality liquid seals, thereby resulting in liquid leakage and/or are difficult or expensive to manufacture.

It is therefore an object of the present invention to provide a re-fillable liquid spray dispenser that is easy to operate, reliably seals the liquid chamber, and which improves manufacturability.

SUMMARY OF THE INVENTION

By means of the present invention, re-filling of a liquid spray dispenser may be consistently performed without liquid leakage. The dispenser of the present invention utilizes a valve body with a resilient sealing gasket that is adapted to sealingly engage a dispensing nozzle from a liquid reservoir. The valve body retains a liquid seal throughout the injection liquid process through a multiple-seal arrangement. Moreover, the valve body is synchronously movable with a venting rod to open and close a vent gasket in the liquid chamber with the opening and closing of the liquid inlet valve. In this manner, the air vent valve is open only when the liquid inlet valve is open.

In one embodiment, the re-fillable liquid spray dispenser of the present invention includes a vessel defining a main chamber and a pump apparatus having a liquid chamber and an air passage venting the main chamber. The pump apparatus defines a central axis that defines mutually perpendicular axial and radial directions. The spray dispenser further includes a piston rod having a hollow interior defining a liquid passage and a piston positioned at the liquid chamber and being axially movable in the pump apparatus by the piston rod to pump liquid from the liquid chamber into the liquid passage, and to draw liquid from the main chamber into the liquid chamber through a first check valve in the pump apparatus. A vent gasket is secured to the pump apparatus, and has a flange portion resiliently contactable with the pump apparatus to releasably seal the air passage. A valve body sealingly engages within an opening of the vessel, and has a first portion with an inlet passage permitting liquid flow through the valve body into the main chamber, and a second portion adapted to receive a discharge nozzle from a liquid reservoir. The valve body is biased into a first position to close the inlet passage. A venting rod is movable by the valve body to disengage the flange portion of the vent gasket from the pump apparatus to open the air passage.

DETAILED DESCRIPTION OF THE PREFERRED EMBODIMENTS

Figure 1A:
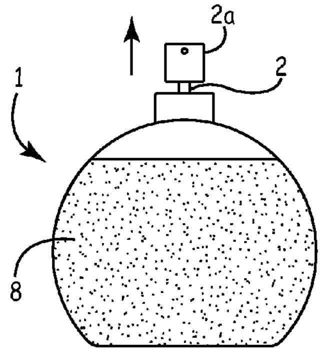
FIGS. 1A-1C are a sequential schematic illustration of a liquid filling operation to a liquid spray dispenser of the present invention.
Figure 1B:
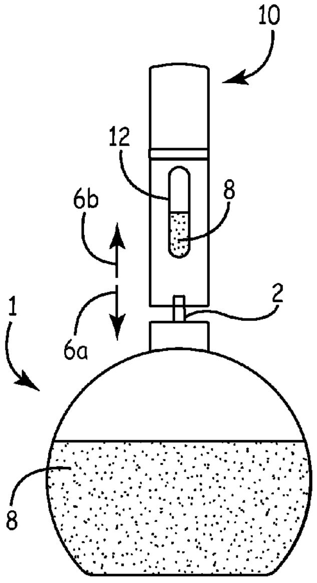
Figure 1C:
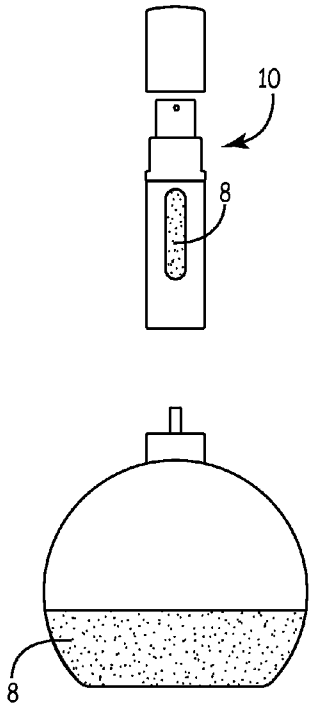

With reference now to the drawing figures, and first to FIGS. 1A-1C, a refillable liquid spray dispenser 10 of the present invention is illustrated in a refilling sequence to fill or re-fill a liquid chamber of dispenser 10 with a liquid 8 contained in a liquid reservoir 1, which may be a container with a discharge 2, such as in the case of a relatively large-volume fragrance container with a spray head 2A. As illustrated in FIG. 1B, dispenser 10 may be engaged with discharge 2 of reservoir 1 to transfer liquid 8 from reservoir 1 into dispenser 10. Spray head 2A may be removed in the illustrated embodiment, such that the stem of discharge 2 engages with dispenser 10 to direct liquid 8 out from reservoir 1 upon a reciprocal pumping action by dispenser 10, as indicated by pumping direction arrows 6A, 6B. The volume of the injected liquid 8 into dispenser 10 may be monitored through a window 12. Once dispenser 10 is desirably filled with liquid 8, dispenser 10 may be disengaged from discharge 2 of reservoir 1 without leakage of liquid 8, either from reservoir 1 or dispenser 10. The liquid level within reservoir 1 is schematically depicted in FIGS. 1A-1C as being reduced in the process of transferring liquid 8 to dispenser 10.

Figure 2A:
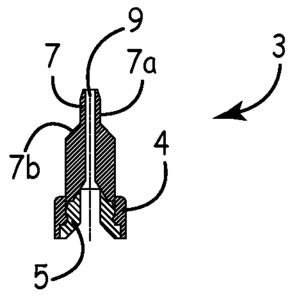
FIG. 2A is a cross-sectional isolation view of a discharge nozzle of the present invention.
Figure 2B:
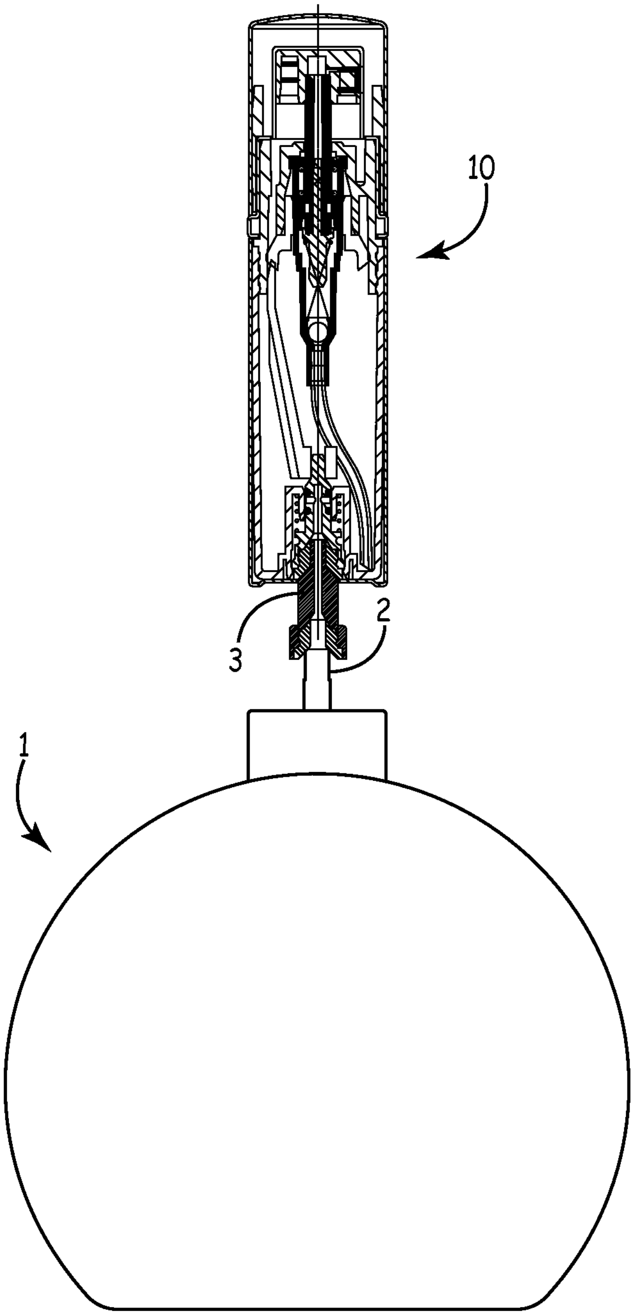
FIG. 2B is a schematic illustration of the discharge nozzle of FIG. 2A in operation with a liquid spray dispenser of the present invention.

In some embodiments, a discharge nozzle 3 may be employed in fluidly coupling reservoir 1 to dispenser 10. Discharge nozzle 3 may therefore constitute an adaptor that is sealingly securable to discharge 2 of reservoir 1, and to dispenser 10, as will be described in greater detail hereinbelow. While a variety of configurations for discharge nozzle 3 are contemplated by the present invention, an example arrangement is illustrated in FIG. 2A, wherein discharge nozzle 3 includes a base portion 4 having an adaptor gasket 5 that resiliently and sealingly engages discharge 2 to establish a liquid-tight seal thereat. Due to the resilient property of adaptor gasket 5, base portion 4 of discharge nozzle 3 is capable of sealingly engaging with discharges 2 of various dimensions. It is known that liquid reservoirs employ various-sized discharges 2, such that base portion 4 of discharge nozzle 3 is capable of functionally adapting to a variety of reservoir discharges. Insert portion 7 of discharge nozzle 3 may be specifically configured for sealing engagement with a valve body and valve gasket of dispenser 10 to discharge liquid 8 into dispenser 10. Insert portion 7 may therefore include a nipple 7*a* and a shoulder 7*b* for sealing engagement and operational cooperation with the valve body of dispenser 10. Liquid 8 passes through a channel 9 extending axially through discharge nozzle 3. The discharge channel 3 is illustrated in FIG. 2B as interfacing between discharge 2 of reservoir 1 and dispenser 10.

Figure 3:
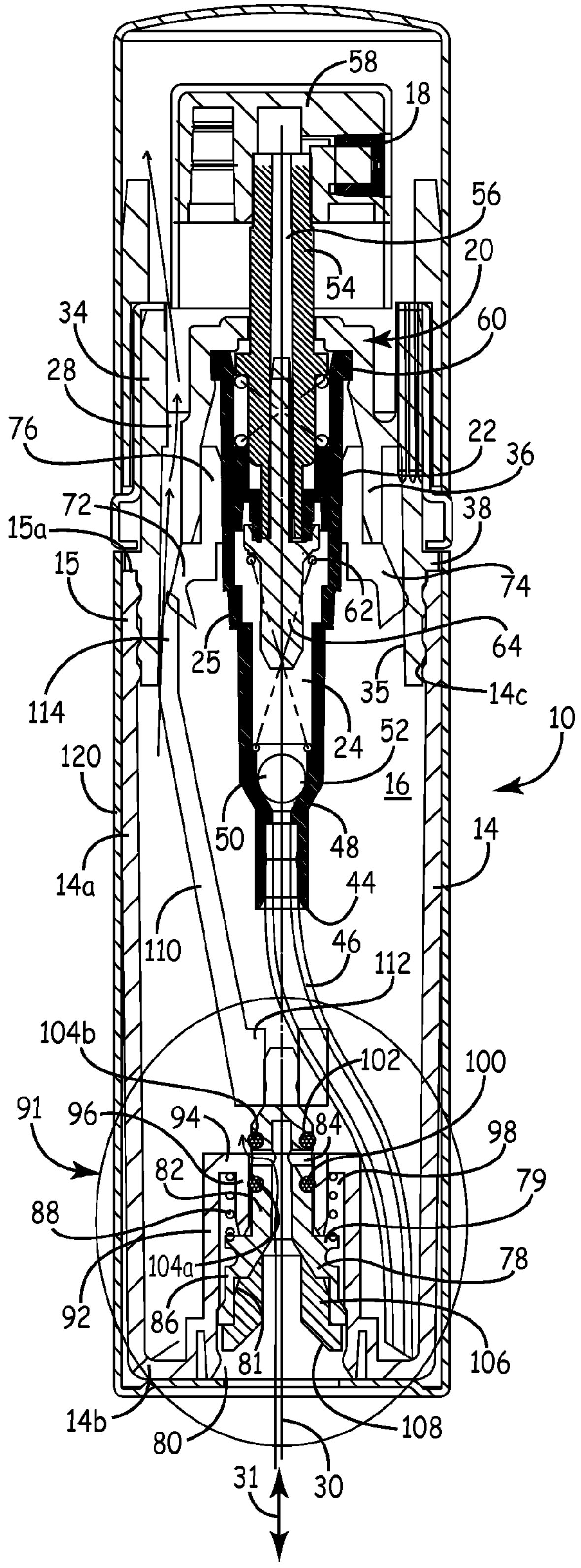
FIG. 3 is a cross-sectional view of a liquid spray dispenser of the present invention.

A detailed cross-sectional view of an embodiment of liquid spray dispenser 10 is illustrated in FIG. 3. A vessel 14 defines a main chamber 16 in which a volume of liquid 8 may be held for dispensation out from spray nozzle 18. In the illustrated embodiment, vessel 14 may comprise an open, substantially cylindrical plastic body with a side wall 14A and an end wall 14B. Other configurations, however, for vessel 14 are contemplated as being useful in the present invention.

Figure 4A:
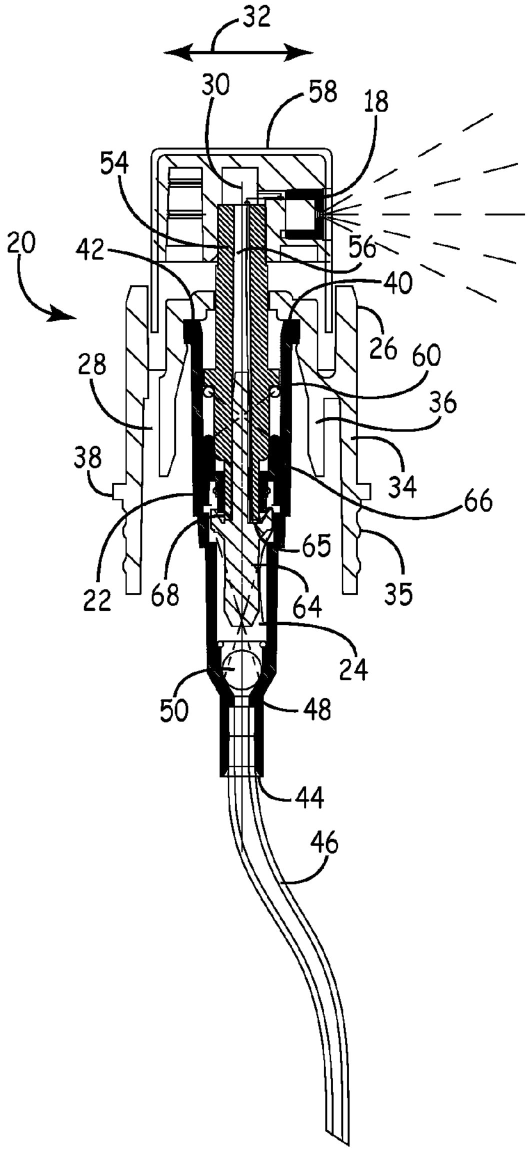
FIG. 4A is a cross-sectional isolation view of a portion of the liquid spray dispenser illustrated in FIG. 3 in a dispensing condition.
Figure 4B:
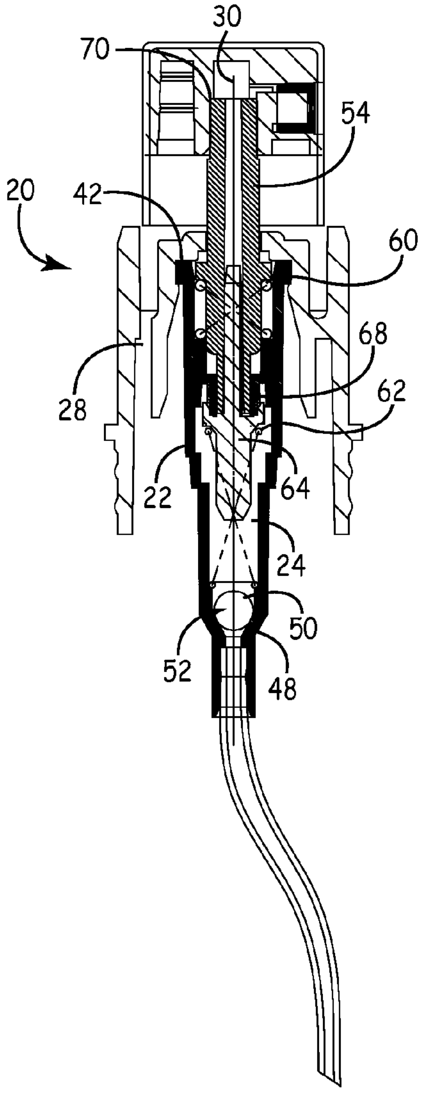
FIG. 4B is a cross-sectional isolation view of a portion of the liquid spray dispenser illustrated in FIG. 3 in a non-dispensing condition.

To vessel 14 is secured a pump apparatus 20, which is shown in isolation in FIGS. 4A and 4B. Pump apparatus 20 includes a cylinder 22 defining a liquid chamber 24. Pump apparatus 20 further includes an attachment member 26 defining an air passage 28 venting main chamber 16 to an exterior environment. Pump apparatus 20 further defines a central axis 30 that itself defines mutually perpendicular axial and radial directions 31, 32. Attachment member 26 of pump apparatus 20 may include an outer brace portion 34 and an inner brace portion 36, with air passage 28 defined between outer and inner brace portions 34, 36 of attachment member 26. Outer brace portion 34 may be secured to vessel 14 to substantially enclose main chamber 16, with the exception of air passage 28. Outer brace portion 34 may be threadably or otherwise engagable with an inner surface 14C of vessel 14 at engagement portion 15 of vessel 14. Thus, outer brace portion 34 may include threads or other surface modifications at connection portion 35 for retainably securing pump apparatus 20 to vessel 14. In one embodiment, outer brace portion 34 may be press-fit within vessel 14, with an annular protrusion 38 arresting the insertion of attachment member 26 into main chamber 16 by contacting an upper rim 15*a* of vessel 14. In one embodiment, attachment member 26 may be a unitary body molded into a single structure annularly arranged about central axis 30.

Attachment member 26 may be secured about cylinder 22, with an annular ridge 40 of cylinder 22 being received in an annular channel 42 of attachment member 26. Cylinder 22 may assume a variety of configurations, but may include a radially-stepped outer diameter to accommodate the operation of the components of pump apparatus 20 described herein. Cylinder 20 includes an inlet 44 which may accommodate a dipper tube 46 for intake of liquid 8 from main chamber 16. Cylinder 22 may also form a lower seat 48 upon which a ball 50 may operably engage to establish a first check valve 52 of pump apparatus 20.

A piston rod 54 may include a hollow interior defining a liquid passage 56 for communicating liquid between liquid chamber 24 and spray nozzle 18. Piston rod 54 may be reciprocally actuated along axial direction 31 by a manual pumping force axially applied to cap 58. The axial pumping force applied to piston rod 54 acts initially against piston 64, and secondarily against the restorative forces of an upper spring 60 and a lower spring 62 to depress piston 64 into liquid chamber 24 to thereby increase pressure within liquid chamber 24. Release of the pumping force at cap 58 permits the restorative forces of upper and lower springs 60, 62 to push piston 64 axially out from liquid chamber 24 to thereby decrease the fluid pressure in liquid chamber 24. Piston 64 is therefore positioned at liquid chamber 24, and is axially movable along axial direction 31 in pump apparatus 20 by piston rod 54 to pump liquid 8 from liquid chamber 24 into liquid passage 56, and to draw liquid 8 from main chamber 16 into liquid chamber 24 through first check valve 52.

A downward pumping stroke of pump apparatus 20 is illustrated in FIG. 4A, wherein a downward force applied to cap 58 is translated to piston rod 56 for downward axial motion of piston rod 54 along axial direction 31. Piston rod 54 bears upon shoulder 65 of piston 64 to force piston 64 downwardly into liquid chamber 24. A pump gasket 66 is slidably secured about piston rod 54, such that relative motion between pump gasket 66 and piston rod 54 is created in the reciprocal motion of piston rod 54 described above. Such relative motion, however, is limited by upper spring 60 having a restorative force acting to oppose the relative upward motion of pump gasket 66 with respect to piston rod 54 upon downward movement of piston rod 54. Upper spring 60 is calibrated to permit a desired extent of relative motion of pump gasket 66 with respect to piston rod 54 in order to open a liquid channel 68 that communicates liquid chamber 24 into liquid passage 56 within piston rod 54. Increased fluid pressure within liquid chamber 24 caused by the downward movement of piston 64 forces ball 50 against lower seat 48 of cylinder 22, thereby closing first check valve 52, and forcing liquid within liquid chamber 24 through liquid channel 68 and liquid passage 56 for dispensation out through spray nozzle 18.

A second part of the pumping cycle is illustrated in FIG. 4B, wherein downward force against cap 58 is removed, thereby permitting upper and lower springs 60, 62 to expand with their respective restorative force, and to push piston 64, pump gasket 66, and piston rod 54 axially upward out from liquid chamber 24. The relative motion of pump gasket 66 with respect to piston rod 54, driven by the restorative force of upper spring 60 moves pump gasket 66 downwardly with respect to piston rod 54 against shoulder 65 of piston 64 to close liquid channel 68. As a consequence, air is prevented from being drawn into liquid chamber 24, and a pressure reduction is produced by the retreating piston 64. The negative pressure within liquid piston 24 lifts ball 50 from lower seat 48 of cylinder 22 to open first check valve 52, to thereby permit liquid 8 inflow from main chamber 16 through dipper tube 46 and inlet 44. Piston rod is arrested from further upward axial movement by cap shoulder 70. Once upward movement of the piston rod/piston combination is halted, fluid pressure in liquid chamber 24 normalizes with fluid pressure in main chamber 16, thereby permitting ball 50 to be acted upon by gravity and a weight of liquid above it in liquid chamber 24 to seat against lower seat 48 of cylinder 22, closing first check valve 52.

A vent gasket 72 is secured to pump apparatus 20, and includes a flange portion 74 that is resiliently contactable with pump apparatus 20 to releasably seal closed air passage 28. In the illustrated embodiment, stem portion 76 of vent gasket 72 is secured between inner brace portion 36 of attachment member 26 and an outer surface 25 of cylinder 22. Stem portion 76 may be friction fit between inner brace portion 36 and cylinder 22. Flange portion 74 of vent gasket 72 may be resiliently contactable with an inner surface 35 of outer brace portion 34, such that flange portion 74 resiliently seals against outer brace portion 34 to releasably close air passage 28 between outer and inner brace portions 34, 36 of attachment member 26. Vent gasket 72 may be fabricated from any desirable resilient material such as various plastics, rubbers, and the like. In one embodiment, vent gasket 72 is silicone.

A valve body 78 is sealingly engaged to vessel 14 in an opening 80 of vessel 14. In the illustrated embodiment, opening 80 may be disposed in base wall 14B. However, it is contemplated that opening 80 may be otherwise disposed in vessel 14. Valve body 78 includes a first portion 82 with an inlet passage 84 permitting liquid flow through valve body 78 into main chamber 16, and a second portion 86 adapted to receive discharge 2, such as discharge nozzle 3 from liquid reservoir 1. A valve body spring 88 has a restorative force which acts to urge valve body 78 axially outwardly along direction 31 into a first position 90 (FIG. 6A) closing inlet passage 84.

Opening 80 of vessel 14 defines a recess having a side wall 92, an end wall 94, and an annular flange 96, which, in combination, define an annular grove 98 annularly arranged about central axis 30. Valve body spring 88 may be positioned in annular groove 98 between end wall 94 and strut portion 79 of valve body 78 to urge valve body 78 downwardly toward first position 90. Valve body 78 is sealingly engaged to vessel 14 at annular flange 96 through first and second sealing rings 100, 102, which may comprise resilient o-rings secured to valve body 78 at retention grooves 104A, 104B. First and second sealing rings 100, 102 may be axially spaced across inlet passage 84, such that inlet passage 84 is disposed axially between first and second sealing rings 100, 102. In this manner, valve body 78 remains sealingly engaged with annular flange 96 of vessel 14 when valve body 78 is actuated into second position 91 through an upward force applied thereto by discharge nozzle 3 of reservoir 1. The two distinct sealing rings 100, 102 provide separate and distinct sealing locations for valve body 78 in sealing engagement with vessel 14 at annular flange 96. Therefore, in first position 90, valve body 78 may be sealingly engaged to annular flange 96 at both first and second sealing rings 100, 102, which resiliently contact both first portion 82 of valve body 78 and annular flange 96 of vessel 14. When valve body 78 is forced axially upward as a result of the liquid injection process described above with respect to FIGS. 1-2, first sealing ring 100 is axially pushed out of contact with annular flange 96 to open inlet passage 84 permitting liquid passage from reservoir 1 through discharge nozzle 3, and through inlet passage 84 into main chamber 16. However, even though first sealing ring 100 is no longer in sealing engagement between first portion 82 of valve body 78 and annular flange 96 of vessel 14, second sealing ring 102, which is arranged axially outwardly from inlet passage 84, remains in sealing engagement between first portion 82 of valve body 78 and annular flange 96 of vessel 14. Such sealing engagement prevents liquid leakage out from main chamber 16 between valve body 78 and annular flange 96.

A resilient valve gasket 106 may be provided at an inner surface 81 of valve body 78 to provide for sealing engagement with nipple 7*a* of discharge nozzle 3 and/or discharge 2 of reservoir 1. Resilient valve gasket 106 is manufactured from a resilient material to establish a liquid-tight seal about nipple 7*a* and/or discharge 2 to prevent liquid leakage from the engagement between discharge 2/discharge nozzle 3 and valve body 78.

In one embodiment, resilient valve gasket 106 includes a tapered portion 108 that may be configured for sealing engagement with shoulder 7*b* of discharge nozzle 3. With reference back to FIG. 2B, transfer of liquid 8 into main chamber 16 of dispenser 10 may be accomplished by pressing downwardly upon dispenser 10 when discharge 2 or discharge nozzle 3 is sealingly engaged at valve body 78. Downward force upon dispenser 10 causes increased pressure between tapered portion 108 of valve gasket 106 and shoulder 7*b* of discharge nozzle 3, which increased pressure overcomes the restorative force of spring 88 to cause valve body 78 to move axially upwardly against the restorative force of spring 88 to thereby open inlet passage 84. The downward force placed upon dispenser 10 concurrently transmits the downward force to discharge 2 of reservoir 1, resulting in downward movement of discharge 2 to pump liquid 8 out from reservoir 1 into channel 9 of discharge nozzle 3, and subsequently through nipple 7*a* of discharge nozzle 3 to inlet passage 84 at valve body 78. Removal of the downward force upon dispenser 10 relieves pressure between shoulder 7*b* and tapered portion 108 of valve gasket 106, thereby permitting the restorative force of valve body spring 88 to move valve body 78 axially downwardly with respect to the recess in vessel 14, and closing inlet passage 84 to prevent backflow of liquid 8 from main chamber 16 into channel 9 of discharge nozzle 3. The relieved downward force upon dispenser 10 also permits a spring within discharge 2 to expand and move discharge 2 axially upwardly to prepare for the next pumping cycle. In this manner, liquid 8 may be uni-directionally transferred from reservoir 1 to main chamber 16 of dispenser 10.

Filling or re-filling of liquid 8 into main chamber 16, as described above, relies upon a venting capability to remove an amount of air from main chamber 16 assuming a volume equivalent to the added liquid volume. The enclosed main chamber 16, in the absence of such a venting capability, would prevent liquid addition in the sealed manner described above. Thus, it is an important aspect of the present invention to provide a mechanism for temporarily venting main chamber 16 simultaneous with liquid transfer to main chamber 16.

Figure 5:
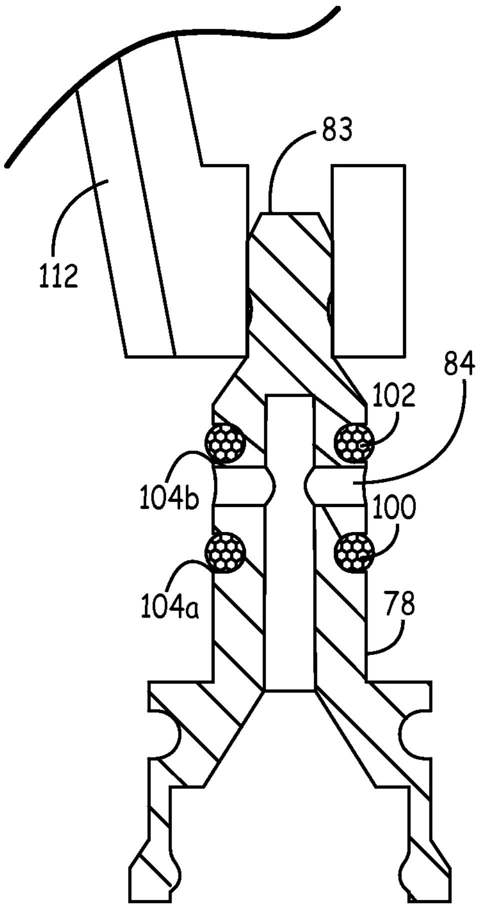
FIG. 5 is a cross-sectional view of a portion of the liquid spray dispenser illustrated in FIG. 3.

To accomplish the venting of main chamber 16 described above, a venting rod 110 is movable by valve body 78 to disengage flange portion 74 of vent gasket 72 from pump apparatus 20 to thereby open air passage 28. As illustrated in FIG. 5, lower portion 112 of venting rod 110 may be secured to connecting portion 83 of valve body 78, such that venting rod 110 is synchronously movable with valve body 78. As described above, valve body 78 may be axially movable upon forces generated between valve gasket 106 and discharge nozzle 3 as a consequence of a downward force on dispenser 10 relative to reservoir 1. When valve body 78 is axially moved upwardly into main chamber 16 to transfer liquid 8 through inlet passage 84 into main chamber 16, venting rod 110 correspondingly moves axially upwardly to simultaneously disengage flange portion 74 of vent gasket 72 from resilient contact with outer brace portion 34 of attachment member 26. Upper portion 114 of venting rod 110 is in sliding engagement with inner surface 35 of outer brace portion 34, such that the upward axial movement driven by valve body 78 causes upper portion 114 to contact flange portion 74 of vent gasket 72. Continued upward axial movement of venting rod 110 causes upper portion 114 to displace the resilient flange portion 72 of vent gasket 72 out from contact with inner surface 35 of outer brace portion 34. Such displacement opens air passage 28 to main chamber 16, and air is permitted to escape therethrough to vent main chamber 16. A driving force for venting air from main chamber 16 is provided by the injection of liquid 8 into main chamber 16 through inlet passage 84. The volume of liquid injected into main chamber 16 increases the air pressure in the head space in main chamber 16 above the filled liquid 8. Such increase air pressure drives the air venting out through the opened air passage 28.

Figure 6A:
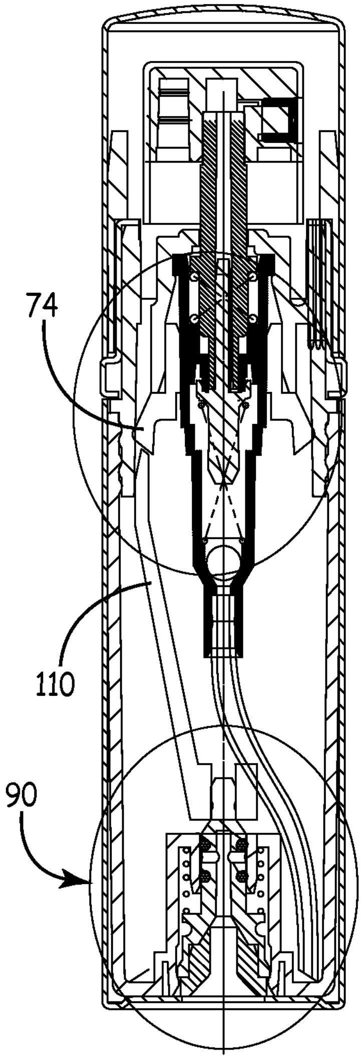
FIG. 6A is a cross-sectional view of a liquid spray dispenser of the present invention in a non-filling condition.
Figure 6B:
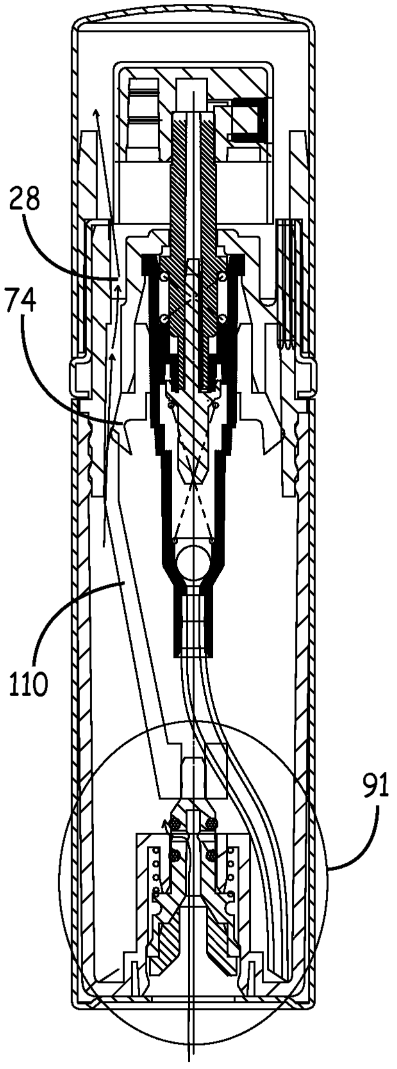
FIG. 6B is a cross-sectional view of a liquid spray dispenser of the present invention in a filling condition.

The opening and closing of air passage 28 by the releasable contact of venting rod 110 with flange portion 72 of vent gasket 72 is illustrated in FIGS. 6A and 6B, wherein valve body 78 being axially biased outwardly of main chamber 16 to a first position 90 is illustrated in FIG. 6A, such that venting rod 110 is out of displacing contact with flange portion 74. However, FIG. 6B illustrates valve body 78 being pushed axially upwardly into a second position 91 to corresponsingly axially upwardly move venting rod 110 to displacingly contact flange portion 74, and to thereby open air passage 28 to vent main chamber 16. Urging of valve body spring 88 against valve body 78 to reposition valve body 78 in first position 90 correspondingly moves upper portion 114 of venting rod 110 out of displacing contact with flange portion 74 of vent gasket 72, thereby permitting re-establishment of resilient sealing contact between flange portion 74 and inner surface 35 of outer brace portion 34 to close air passage 28. Thus, venting rod 110 cyclically opens and closes air passage 18 through synchronous motion with valve body 78 corresponding to the liquid filling cycle described above. Therefore, when liquid 8 is not being injected into main chamber 16, vent gasket 72 is typically in sealing engagement with outer brace portion 34 of attachment member 26 to seal closed air passage 28. This arrangement provides for an enclosed main chamber 16 to aid in dispensing liquid 8 out through spray nozzle 18.

In some embodiments, an outer casing 120 may be provided for decorative and/or protective purposes. In one embodiment, outer casing 120 may be fabricated from a high-grade aluminum material.

Figure 7:
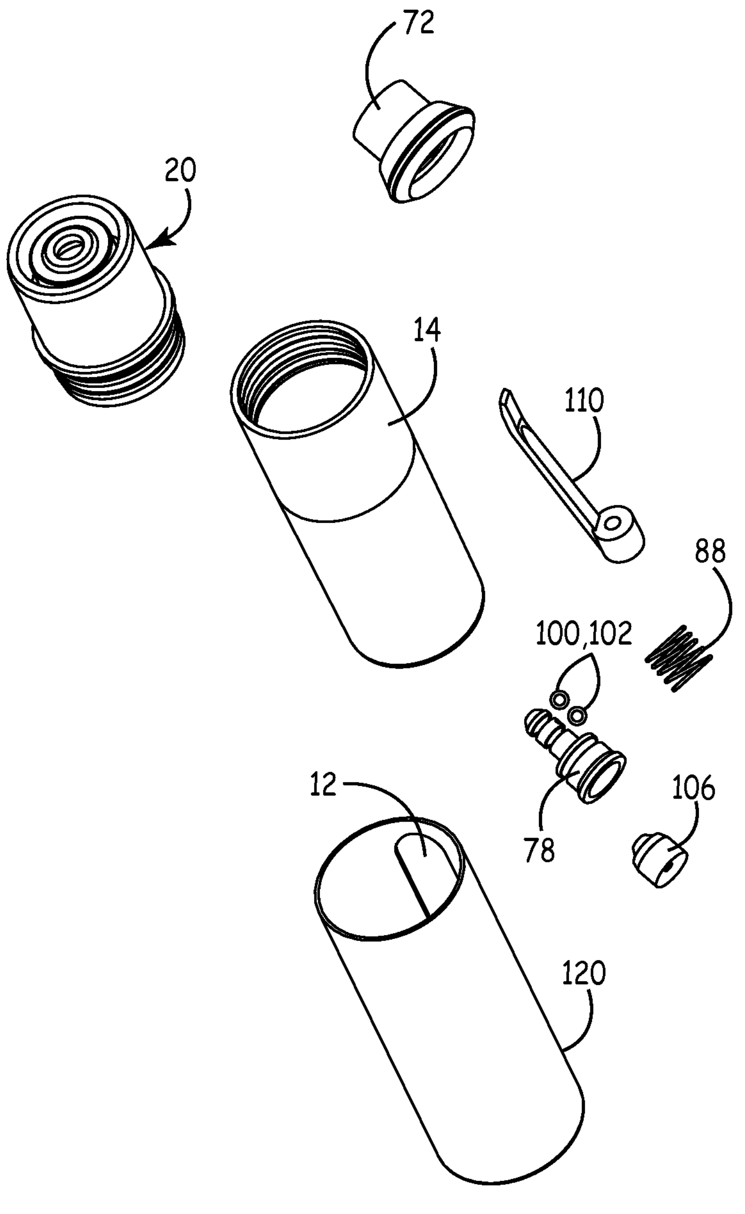
FIG. 7 is an exploded component view of a liquid spray dispenser of the present invention.

An exploded component view of liquid spray dispenser 10 is illustrated in FIG. 7.

The invention has been described herein in considerable detail in order to comply with the patent statutes, and to provide those skilled in the art with the information needed to apply the novel principles and to construct and use embodiments of the invention as required. However, it is to be understood that various modifications may be accomplished without departing from the scope of the invention itself.

What is claimed is:

1. A re-fillable liquid spray dispenser, comprising:

a vessel defining a main chamber;

a pump apparatus having a liquid chamber and an air passage venting said main chamber, and defining a central axis that defines mutually perpendicular axial and radial directions;

a piston rod having a hollow interior defining a liquid passage;

a piston positioned at said liquid chamber and being axially movable in said pump apparatus by said piston rod to pump liquid from said liquid chamber into said liquid passage and to draw liquid from said main chamber into said liquid chamber through a first check valve in said pump apparatus;

a vent gasket secured to said pump apparatus, and having a flange portion resiliently contactable with said pump apparatus to releasably seal said air passage;

an opening in said vessel;

a valve body sealingly engaged to said vessel in said opening and having a first portion with an inlet passage permitting liquid flow through said valve body into said main chamber, and a second portion adapted to receive a discharge nozzle of a liquid reservoir, said valve body biasably movable into a first position to close said inlet passage; and a venting rod movable by said valve body to disengage said flange portion of said vent gasket from said pump apparatus to open said air passage.

2. A re-fillable liquid spray dispenser as in claim 1, including a resilient valve gasket at said second portion of said valve body for sealingly engaging the discharge nozzle of the liquid reservoir.

3. A re-fillable liquid spray dispenser as in claim 1 wherein said venting rod is synchronously movable with said valve body.

4. A re-fillable liquid spray dispenser as in claim 3 wherein said venting rod and said valve body axially move in unison, with said valve body being biased outwardly of said main chamber.

5. A re-fillable liquid spray dispenser as in claim 1 wherein said pump apparatus includes an attachment member having an outer brace portion and an inner brace portion, with said air passage defined between said inner and outer brace portions of said attachment member.

6. A re-fillable liquid spray dispenser as in claim 5 wherein said outer brace portion of said attachment member is secured to said vessel to enclose said main chamber.

7. A re-fillable liquid spray dispenser as in claim 6 wherein a cylinder of said pump apparatus is secured to said inner brace portion of said attachment member.

8. A re-fillable liquid spray dispenser as in claim 7 wherein a stem portion of said vent gasket is secured between said inner brace portion of said attachment member and said cylinder.

9. A re-fillable liquid spray dispenser as in claim 7 wherein said flange portion is resiliently contactable with said outer brace portion of said attachment member.

10. A re-fillable liquid spray dispenser as in claim 1, including a spray nozzle communicatable with said liquid passage.

11. A re-fillable liquid spray dispenser as in claim 1 wherein said opening defines a recess having a side wall, an end wall, and an annular flange which, in combination, define an annular groove annularly arranged about said central axis.

12. A re-fillable liquid spray dispenser as in claim 1, including first and second sealing rings sealingly engaging said valve body to said vessel, said first and second rings being axially spaced across said inlet passage.

* * * * *